United States Patent
Teggatz et al.

[11] Patent Number: 5,808,884
[45] Date of Patent: Sep. 15, 1998

[54] CIRCUIT AND METHOD FOR CONSERVING ENERGY IN A BOOST REGULATOR CIRCUIT

[75] Inventors: Ross E. Teggatz, McKinney; Rex M. Teggatz, Richardson, both of Tex.

[73] Assignee: Texas Instruments Incorporated, Dallas, Tex.

[21] Appl. No.: 682,946

[22] Filed: Jul. 16, 1996

[51] Int. Cl.[6] .................................................. H02M 7/79
[52] U.S. Cl. ........................... 363/98; 363/132; 323/222; 323/283
[58] Field of Search ................................. 323/222, 282, 323/283, 351; 363/17, 98, 132

[56] References Cited

U.S. PATENT DOCUMENTS

| | | | |
|---|---|---|---|
| 4,527,096 | 7/1985 | Kindlmann | 315/169.3 |
| 4,533,986 | 8/1985 | Jones | 363/17 |
| 4,736,151 | 4/1988 | Dishner | 323/222 |
| 4,939,381 | 7/1990 | Shibata et al. | 363/98 |
| 5,181,169 | 1/1993 | Murugan | 323/222 |
| 5,359,274 | 10/1994 | Bandel | 363/132 |
| 5,373,195 | 12/1994 | De Doncker et al. | 363/98 |
| 5,406,471 | 4/1995 | Yamanaka | 323/222 |
| 5,408,403 | 4/1995 | Nerone et al. | 363/132 |
| 5,483,436 | 1/1996 | Brown et al. | 363/98 |
| 5,519,306 | 5/1996 | Itoh et al. | 363/222 |

*Primary Examiner*—Jeffrey L. Sterrett
*Attorney, Agent, or Firm*—Alan K. Stewart; W. James Brady, III; Richard L. Donaldson

[57] ABSTRACT

A boost regulator circuit includes a rechargeable power supply Vcc, an energy storage component 22 coupled to the rechargeable power supply, a load $C_L$, and a bi-directional drive means (S1-S6, 20 and 27) for delivering energy from the energy storage component 22 to the load $C_L$. The bi-directional drive means allows energy transferred to the load to be recovered back to the rechargeable power supply Vcc before switching the load $C_L$ in an opposite direction, thereby effectuating an efficient management of energy and extending the life of the rechargeable power supply Vcc.

4 Claims, 4 Drawing Sheets

CIRCUIT AND METHOD FOR CONSERVING ENERGY IN A BOOST REGULATOR CIRCUIT

INCORPORATION BY REFERENCE

The following patent application is assigned to Texas Instruments Incorporated and is hereby incorporated by reference:

Ser. No. 08/344,838; (Docket No. TI-18947).

FIELD OF THE INVENTION

This invention relates to electronic circuits and more particularly relates to boost regulator circuits.

BACKGROUND OF THE INVENTION

The use of backlighting for a multitude of displays has increased over the years. Various methods of providing backlighting have been used. One solution utilizes an electroluminescent (EL) driving scheme. FIG. 1 illustrates a prior art boost regulator circuit 10 for driving a backlight (EL load $C_L$) as taught in U.S. Pat. No. 4,527,096 assigned to Timex Corporation. Backlight ($C_L$) is a capacitive load. Prior art boost regulator circuit 10 drives the EL load $C_L$ by periodically pulsing a drive transistor M1 on and off. Each time M1 is turned on, the current through an inductor 22 increases. Each time M1 is turned off energy in inductor 22 (approximately $½LI^2$) is dumped through a diode 20 into EL load $C_L$ through an H-bridge circuit of transistors M2, M3, M4 and M5. Each time energy from inductor 22 is transferred to EL load $C_L$ the voltage across $C_L$ is "boosted." After a predetermined number of boosts (determined by an oscillator circuit 12 and a divider circuit 14), EL load $C_L$ is driven in the opposite direction by the H-bridge circuit and the boosting process begins again. Oscillator circuit 12 drives drive transistor MI. A divider circuit 14 divides the oscillator signal by a predetermined number ("N") and uses that signal to switch the conduction path of the H-bridge circuit. In one conduction path, transistor M2 and M5 are conducting and current flows through M2, through EL load $C_L$ and through M5 to circuit ground. In a second conduction path, current flows through M4, through EL load $C_L$ and through M3 to circuit ground. Circuit 10 drives EL load $C_L$ in both directions causing an ac voltage signal to be seen across the EL load, thus creating luminance.

The voltage across $C_L$ in the prior art boost regulator circuit 10 is illustrated in prior art FIG. 5. Each "boost" (illustrated by a step in prior art FIG. 5) in the voltage across EL load $C_L$ represents the moment drive transistor M1 turns off and the energy in inductor 22 is transferred to EL load $C_L$. In this example, the direction which EL load $C_L$ is driven is switched every seven conduction cycles of M1. Therefore divider circuit 14 is a "divide-by-seven" divider circuit ("N"=7). The voltage waveform across EL load $C_L$, as illustrated in prior art FIG. 5, therefore appears to be approximately a triangle, or sawtooth, waveform. The RMS value of the waveform of FIG. 5 is directly proportional to the luminance of backlight $C_L$. ($RMS_{FIG. 5} \propto$ Luminance ($C_L$)).

It is an object of this invention to provide an improved boost regulator circuit having substantially better efficiency than prior art boost regulator circuits.

It is another object of this invention to provide an improved boost regulator circuit having substantially better performance than prior art boost regulator circuits. Other objects and advantages of the invention will become apparent to those of ordinary skill in the art having reference to the following specification together with the drawings herein.

SUMMARY OF THE INVENTION

A boost regulator circuit includes a rechargeable power supply, an energy storage component coupled to the rechargeable power supply, a load, and a bi-directional drive means for delivering energy from the energy storage component to the load. The bi-directional drive means allows energy transferred to the load to be recovered back to the rechargeable power supply before switching the load in an opposite direction, thereby effectuating an efficient management of energy and extending the life of the rechargeable power supply.

DESCRIPTION OF THE INVENTION

Many EL backlight display applications require minimal power dissipation because they are used in micro-power products such as watches, calculators, lap-top computers, pagers and cellular phones. Circuit 10 of prior art FIG. 1 uses an H-bridge configuration to provide illuminance. However, each time EL load $C_L$ is switched to drive in the opposite direction all the charge across EL load $C_L$ is dissipated to ground. Therefore the energy stored across EL load $C_L$ is squandered after each polarity transition.

Figure 2:
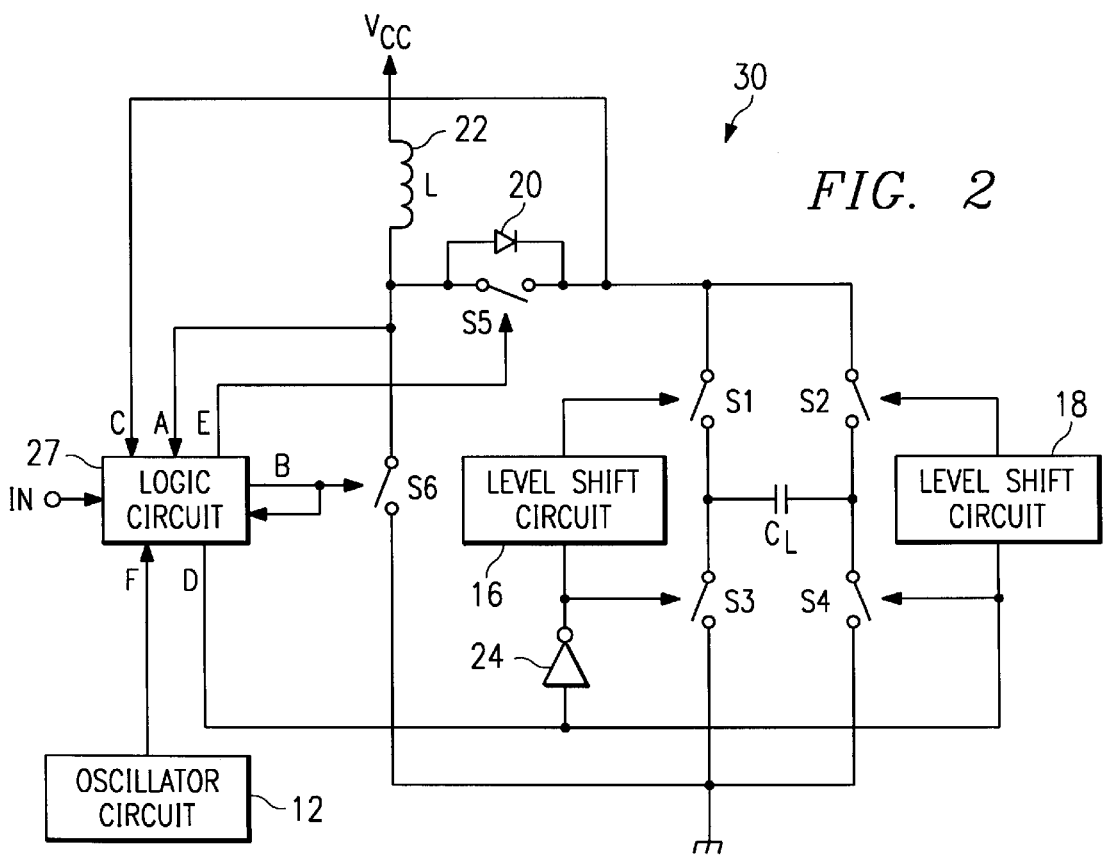
FIG. 2 is a combined block/schematic diagram illustrating an embodiment of the invention, an improved boost regulator circuit 30.

FIG. 2 is a combined block diagram/circuit diagram illustrating a circuit and technique to recover energy stored in EL load $C_L$. Circuit 30 advantageously recovers the energy stored in EL load $C_L$ before polarity transition by diverting energy back to a power supply Vcc. This form of energy recovery is desirable with applications using a power supply that enables energy to be absorbed such as a NiCad (nickel cadmium) battery. Any power supply that may absorb diverted energy falls within the scope of the invention.

FIG. 2 is a combined block/schematic diagram illustrating a first embodiment of the invention, an improved boost regulator circuit 30. Circuit 30 has a drive switch S6 coupled in series with inductor 22 between a power supply Vcc and a circuit ground potential. A diode 20 (or, alternatively, any unidirectional "passing" element) has an anode connected to S6 and a cathode connected to an H-bridge circuit composed of switches S1, S2, S3, S4 and EL load $C_L$. A switch S5 is connected in parallel with diode 20. A logic circuit 27 is connected to a control terminal of S6. An input (labelled IN) is connected to logic circuit 27. Alternatively, oscillator circuit 12 may be incorporated into logic circuit 27. An oscillator circuit 12 is also coupled to logic circuit 27. Logic circuit 27 is also coupled to the control terminals of S1, S2, S3, S4 and S5 either directly or through an inverter 24 and level shift circuits 16 and 18 to control the direction in which EL load $C_L$ is driven. Improved boost regulator circuit 30 drives EL load $C_L$ more efficiently than prior art boost regulator circuit 10 by monitoring the voltage across inductor 22 and EL load $C_L$ and driving switches S5 and S6 in response to the monitoring of those voltages.

Figure 3:
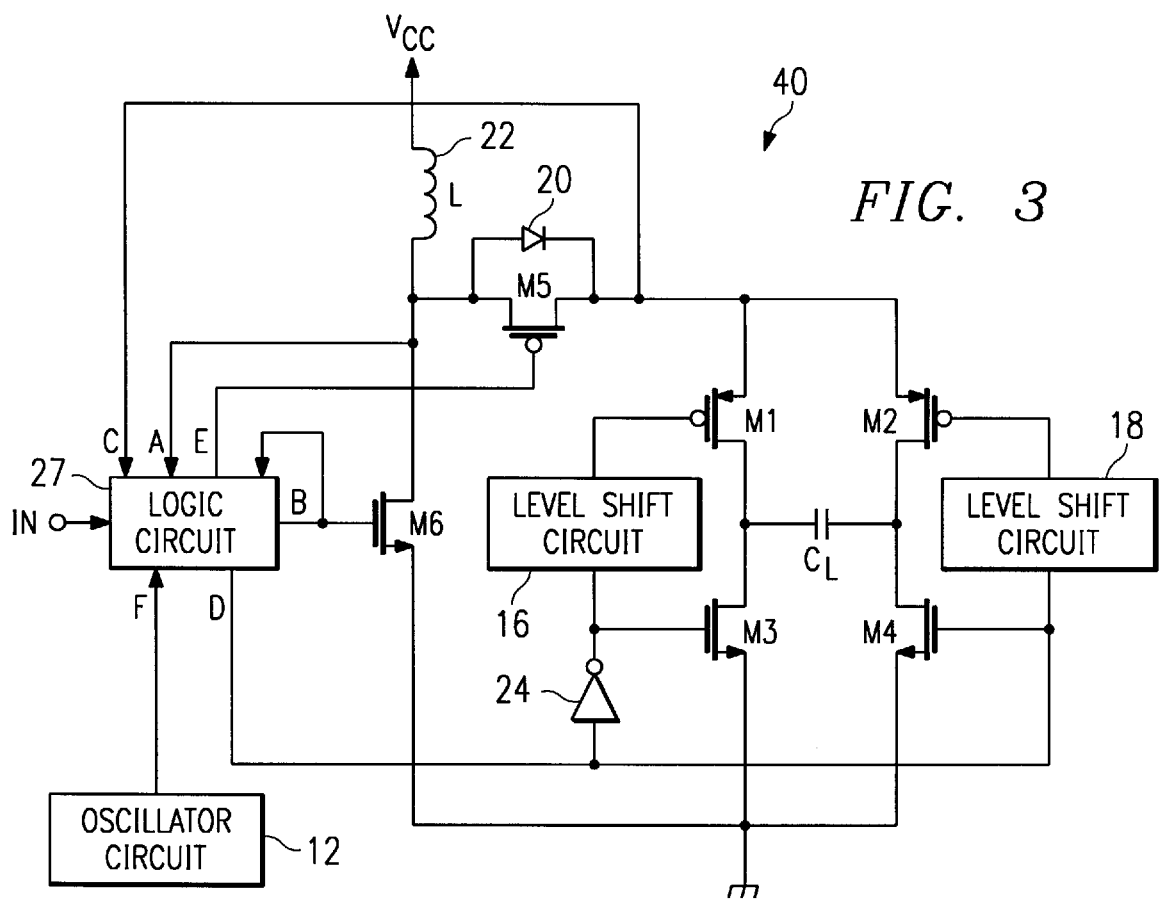
FIG. 3 is a combined block/schematic diagram 40 illustrating an alternative embodiment of the invention.

FIG. 3 is a combined block diagram/circuit diagram 40 illustrating an embodiment of the invention. Circuit 40 has a PMOS transistor M5 in place of switch S5 and PMOS transistors M1 and M2 in place of switches S1 and S2 and NMOS transistors M3 and M4 in place of switches S3 and S4 in circuit 30 of FIG. 2. Alternatively, M5 could be an NMOS transistor with a level shift circuit to activate it.

Figure 4:
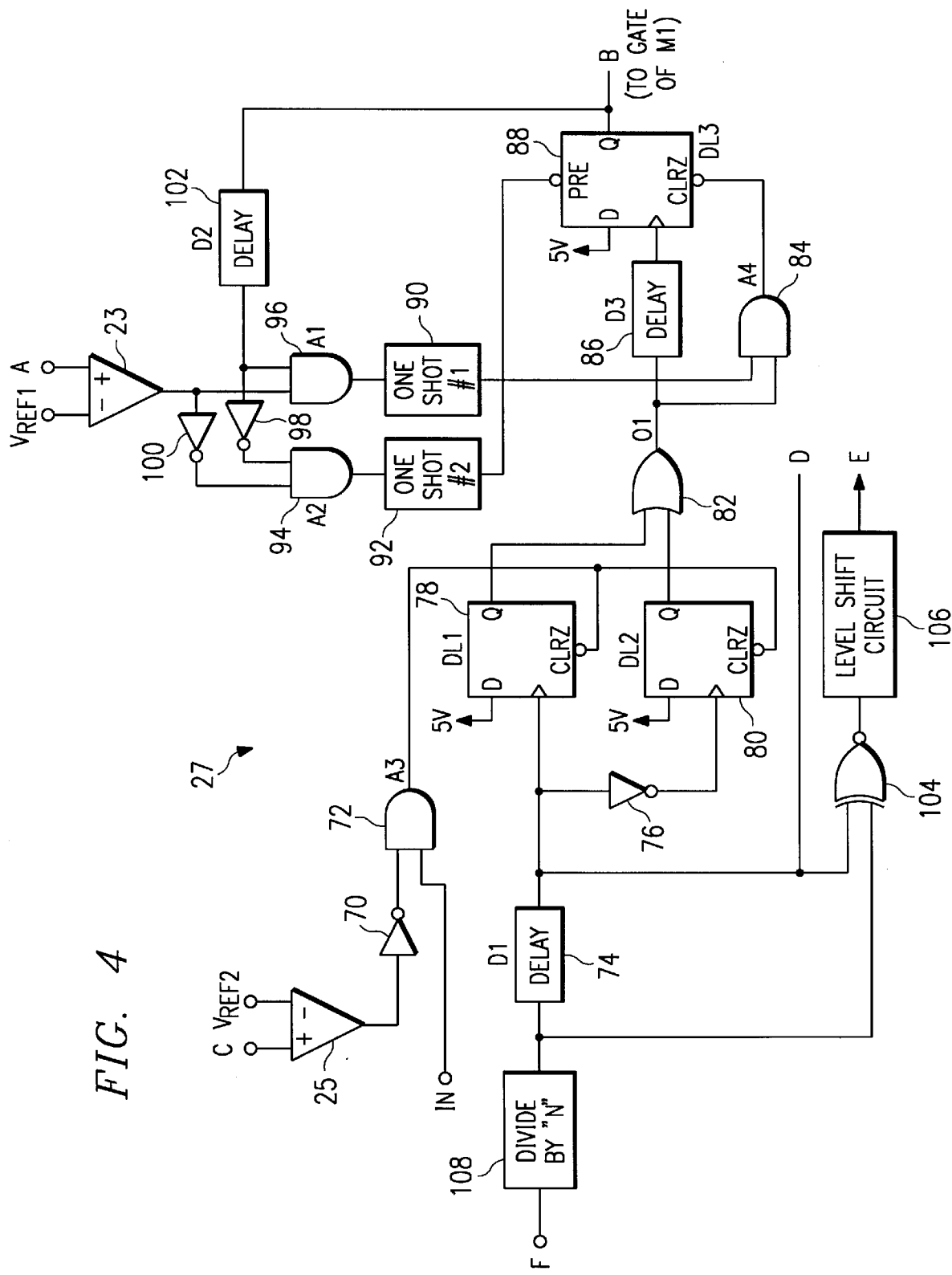
FIG. 4 is a logic diagram illustrating an embodiment for logic circuit 27 of FIGS. 2 and 3.

FIG. 4 is a schematic diagram illustrating an embodiment of logic circuit 27 of FIGS. 2 and 3. Logic circuit 27 has a plurality of D-type latches, DL1, DL2, and DL3, AND gates, A1, A2, A3, and A4, delay elements, D1, D2, and D3, and other logic circuit elements coupled together to provide appropriate control as discussed in this specification.

Figure 1:
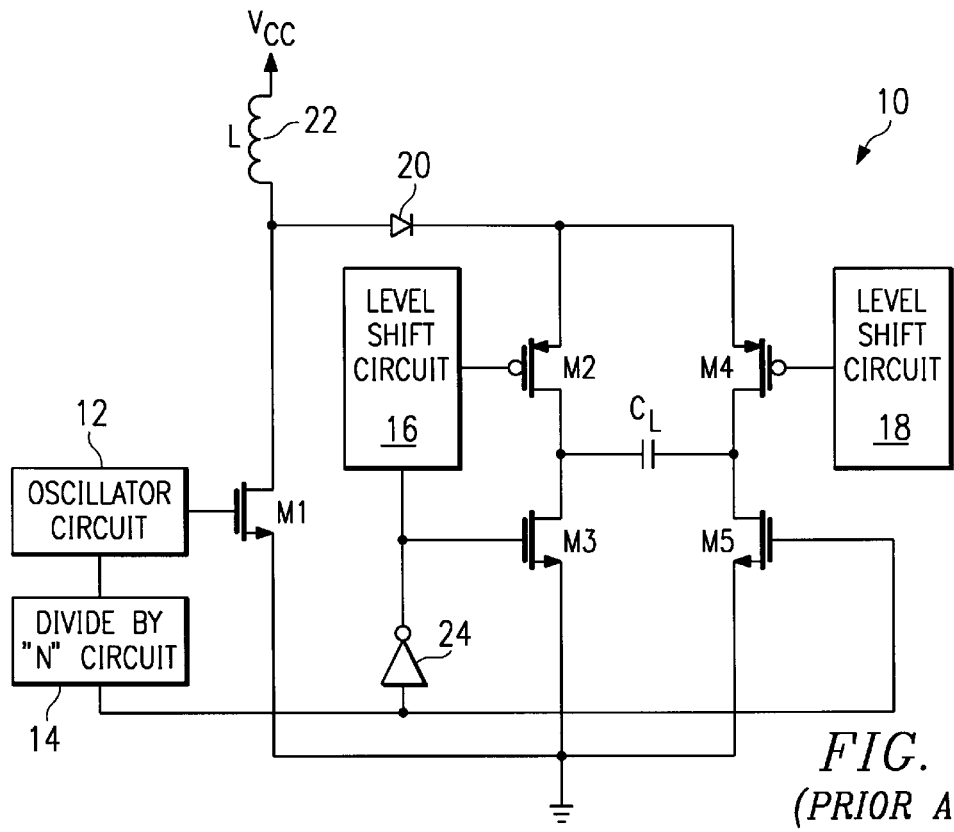
FIG. 1 is a prior art combined block/schematic diagram illustrating a boost regulator circuit 10.
Figure 5:
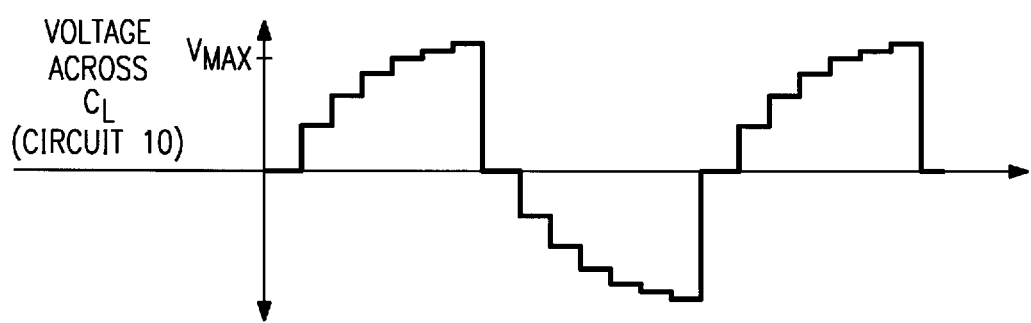
FIG. 5 is a prior art timing diagram illustrating the voltage waveform across EL load $C_L$ for prior art boost regulator circuit 10 of FIG. 1.

FIG. 5 is a prior art voltage waveform diagram illustrating the voltage waveform across EL load $C_L$ of prior art FIG. 1.

Figure 5A:
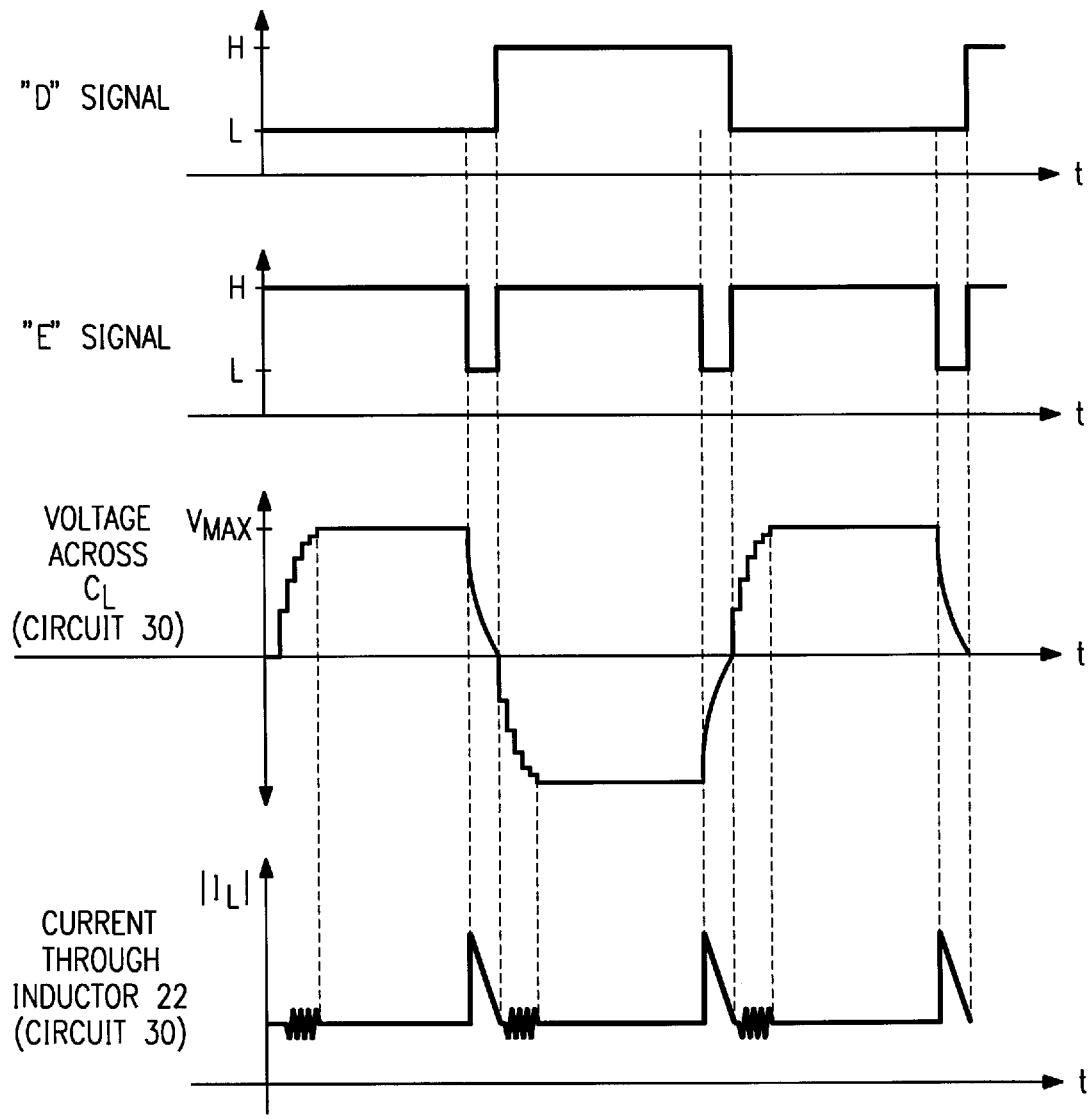
FIG. 5a is a timing diagram illustrating the voltage waveform across an EL load, $C_L$, over time for an embodiment of the invention, improved boost regulator circuit 30 of FIG. 2.

FIG. 5a is a voltage waveform diagram illustrating the voltage waveform across EL load $C_L$ of circuit 30 of FIG. 2. FIG. 5a further illustrates the relationship of control signals "D" and "E" from logic circuit 27 of FIG. 4 with respect to the voltage waveform across EL load $C_L$.

Improved boost regulator circuit 30 of FIG. 2 operates in the following manner. At an initial time, logic circuit 27 outputs a digital high value to S6 via its "B" terminal, thus turning S6 on. With S6 conducting, the current through inductor 22 will rise approximately linearly. At a later time, dictated by comparator 25 of FIG. 4 tripping (as current through inductor 22 increases, the voltage across S6 increases; when the voltage across S6 is greater than $V_{REF2}$ the gate turns off), logic circuit 27 goes low thus turning S6 off. At that moment, an inductive flyback occurs at the node between S6 and inductor 22 because inductor 22 cannot instantaneously become an open circuit. The energy stored in inductor 22 ($\frac{1}{2}[LI^2]$) is transferred through diode 20 to EL load $C_L$. The energy transfer to EL load $C_L$ continues until the current in inductor 22 has gone to zero. The node voltage of S6 is then at Vcc. There will be undershoot at S6 due to ringing caused by an LC resonator circuit, where C is contributed by a parasitic capacitance from S6. When the node voltage at S6 falls below the predetermined voltage value, $V_{REF2}$ (as seen at comparator 25 of FIG. 4), comparator 25 within logic circuit 27 of FIG. 4 triggers, causing its output to go high. Logic circuit 27, in response to comparator 25 going high, immediately turns S6 back on, thereby quickly repeating the process of storing energy in inductor 22 and transferring that energy to EL load $C_L$. Boost regulator circuit 30 begins storing energy in inductor 22 as soon as is possible (immediately after the energy in inductor 22 has been transferred to EL load $C_L$) thereby eliminating "dead time." Because boost regulator circuit 30 immediately turns S6 back on after the inductive flyback of the voltage at S6, the energy transfer to EL load $C_L$ occurs more quickly than prior art. Each transfer of energy from inductor 22 to EL load $C_L$ may be considered an energy storage mode.

As successive energy transfers occur from inductor 22 to EL load $C_L$, the voltage across EL load $C_L$ increases. When the node voltage across EL load $C_L$ reaches a predetermined voltage, $V_{REF1}$ first comparator 23 of logic circuit 27 triggers and its output goes high. When the output of first comparator 23 goes high, logic circuit 27 turns S6 off thereby saving power.

Second predetermined voltage, $V_{REF2}$, is set to a value that ensures that when inductor 22 begins to saturate and the current increases greatly in inductor 22, thereby causing the node voltage across S6 to increase due to the on-resistance of switch S6 and current product, comparator 25 will trigger and cause logic circuit 27 to turn off S6 and thereby transfer the energy from the inductor 22 to EL load $C_L$.

Second predetermined voltage, $V_{REF2}$, is also set to trigger second comparator 25 high when the voltage at S6 flies back when switched (due to inductor 22). After flyback, the voltage at S6 falls, and upon falling below $V_{REF2}$ second comparator 25 triggers high. Therefore second comparator 25 performs two functions. For example if inductor 22 were to saturate when the voltage across S6 is 1V, $V_{REF2}$ could be set at 1V, thereby causing second comparator to trip and prevent inductor 22 from saturating. An additional series resistance could further be added to vary this. Additionally, when S6 turns off and experiences inductive flyback, when the voltage at S6 falls below 1V, second comparator 25 triggers high causing S6 to turn back on and thereby efficiently transfer energy to EL load $C_L$.

Boost regulator circuit 30 of FIG. 2 monitors the voltage across S6 and immediately repeats the energy transfer process and monitoring the current in inductor 22 to ensure that inductor 22 does not excessively saturate and monitors the node voltage across EL load $C_L$ to ensure S6 discontinues switching after reaching a predetermined maximum voltage, thereby ensuring maximum energy transfer from inductor 22 to EL load $C_L$.

After a predetermined period of time the divide by "N" circuit 108 of logic circuit 27 goes high. This period of time is dictated by oscillator circuit 12 in conjunction with divide by "N" circuit 108 of FIG. 4; after "N" cycles of oscillator 12 with "N" being determined by the designer depending upon the frequency required to toggle the polarity across $C_L$. When the output of divide by "N" circuit 108 transitions the output of exclusive NOR gate 104 goes low (for a brief period of time determined by delay 74 (D1)) which is also the "E" signal from control circuit 27. When the "E" signal of logic circuit 27 goes low, S5 turns on and behaves like a short circuit; and a return path is created between EL load $C_L$ and Vcc. The energy stored in EL load $C_L$ is transferred back to the power supply Vcc as seen in the current spike in inductor 22 in FIG. 5a. In this manner, the energy across EL load $C_L$ is not wasted, thereby substantially increasing the supply life of supply voltage Vcc. After a brief period of time (the delay 74 (D1 of FIG. 4) the "D" signal goes high, causing the "B" signal to go high due to the exclusive NOR gate 104. This turns 5 off and simultaneously changes the direction that the H-bridge circuit (composed of switches S1, S2, S3 and S4) will drive EL load $C_L$. The process of switching S6 to boost the voltage across EL load $C_L$ then begins again. This advantageously allows for a substantial increase in battery life. In portable, micro-power applications, the increased battery life through this novel energy recovery circuit and methodology provides substantial cost and performance benefits over prior art solutions.

FIG. 3 replaces switches S1–S6 with PMOS and NMOS transistors (M1–M6) respectively. Although FIG. 3 shows MOS type transistors, this invention also would include use of bipolar transistors or a combination BiCMOS type circuit solution. Any circuit solution encompassing energy diversion from EL load $C_L$ back to the battery (Vcc) or some form of rechargeable power supply, temporary energy storage location or component, DC-to-DC converter or transistor winding that uses a voltage storing element would fall within the scope of this invention.

Although the invention has been described with reference to the preferred embodiment herein, this description is not to be construed in a limiting sense. Various modifications of the disclosed embodiment as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A boost regulator circuit, comprising:

an H-bridge circuit;

a load connected to the H-bridge circuit capable of being driven bi-directionally;

a diode having an anode and a cathode, wherein the cathode is connected to the H-bridge circuit;

a first electrical switch connected in parallel with the diode;

an inductive element connected between the anode of the diode and a power supply node;

a second electrical switch connected between the anode of the diode and a circuit ground potential, the second electrical switch is activated by a pulse signal a control circuit connected to the first and second electrical switches and the H-bridge circuit, wherein the control circuit first activates the second electrical switch and controls the H-bridge circuit to drive the load in a first polarity, and then deactivates the second electrical switch, and activates the first electrical switch before switching the H-bridge circuit to drive the load in an opposite polarity thereby transferring energy stored in the load through the first electrical switch to the power supply node.

2. A method of conserving energy in a boost regulator circuit, comprising the steps of:

driving a load in a first polarity, thereby causing a voltage potential to develop across the load and energy to be stored within the load;

enabling a discharge path between the load and a power supply node;

transferring the energy stored in the load to the power supply node;

disabling the discharge path; and driving the load in a second polarity.

3. The method of claim 2, wherein the step of enabling a discharge path between the load and a power supply node comprises activating a switch between the load and the power supply node creating an effective short circuit between the load and the power supply node, thereby allowing energy stored in the load to easily transfer to the power supply node, minimizing the resulting power drain on the power supply node.

4. A method of conserving energy in a boost regulator circuit, comprising the steps of:

incrementally driving a load in a first polarity, thereby causing a voltage potential to be incrementally boosted across the load until the voltage potential reaches a predetermined level;

enabling a discharge path between the load and a power supply node after the voltage potential reaches a predetermined level;

transferring the energy stored in the load to the power supply node;

disabling the discharge path; and driving the load in a second polarity.

* * * * *